Figure 24:
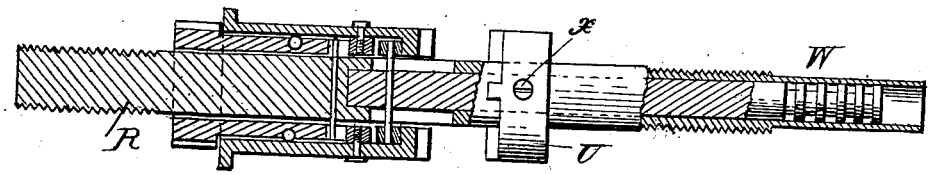

No. 863,423. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
7 SHEETS—SHEET 1.
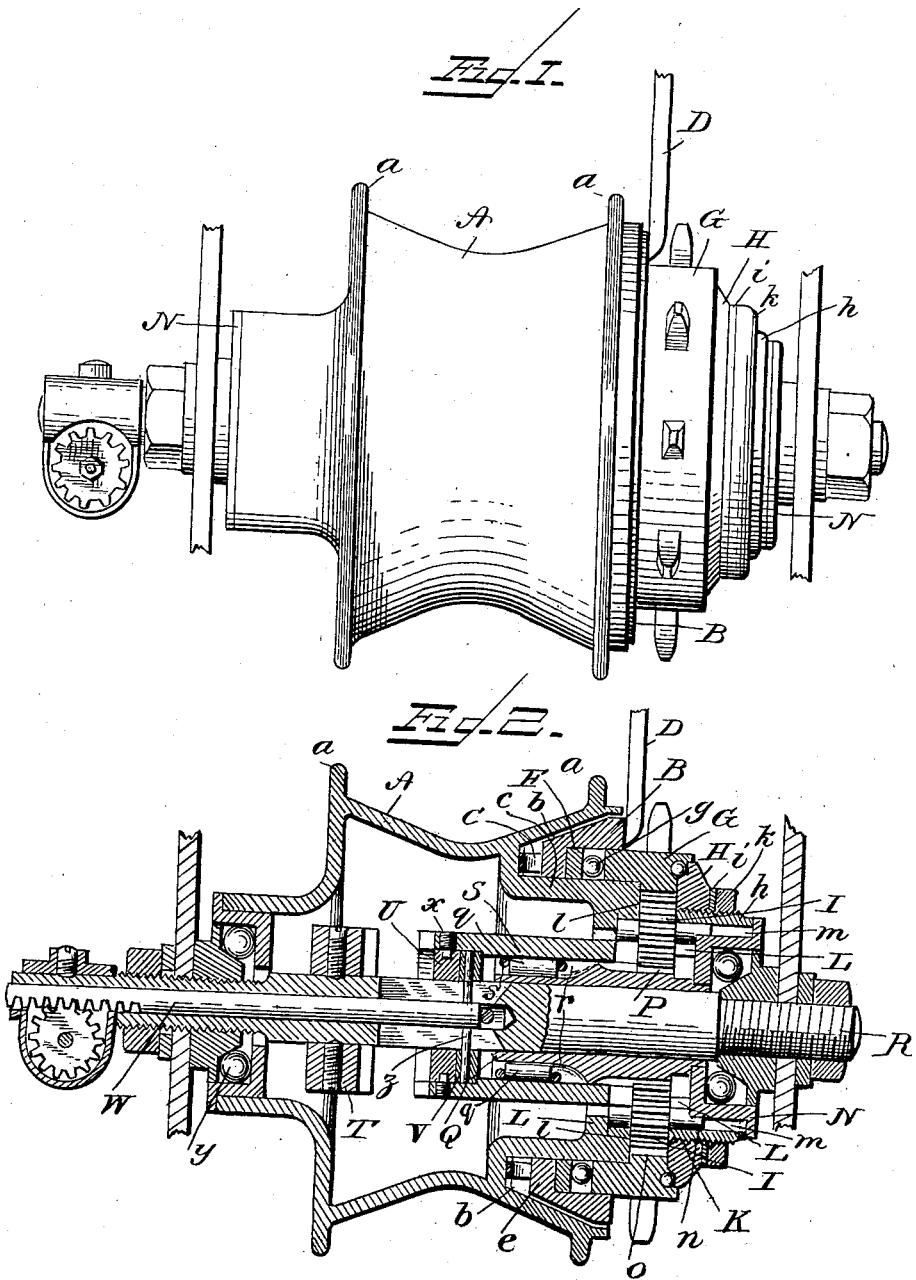

No. 863,423. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
7 SHEETS—SHEET 2.
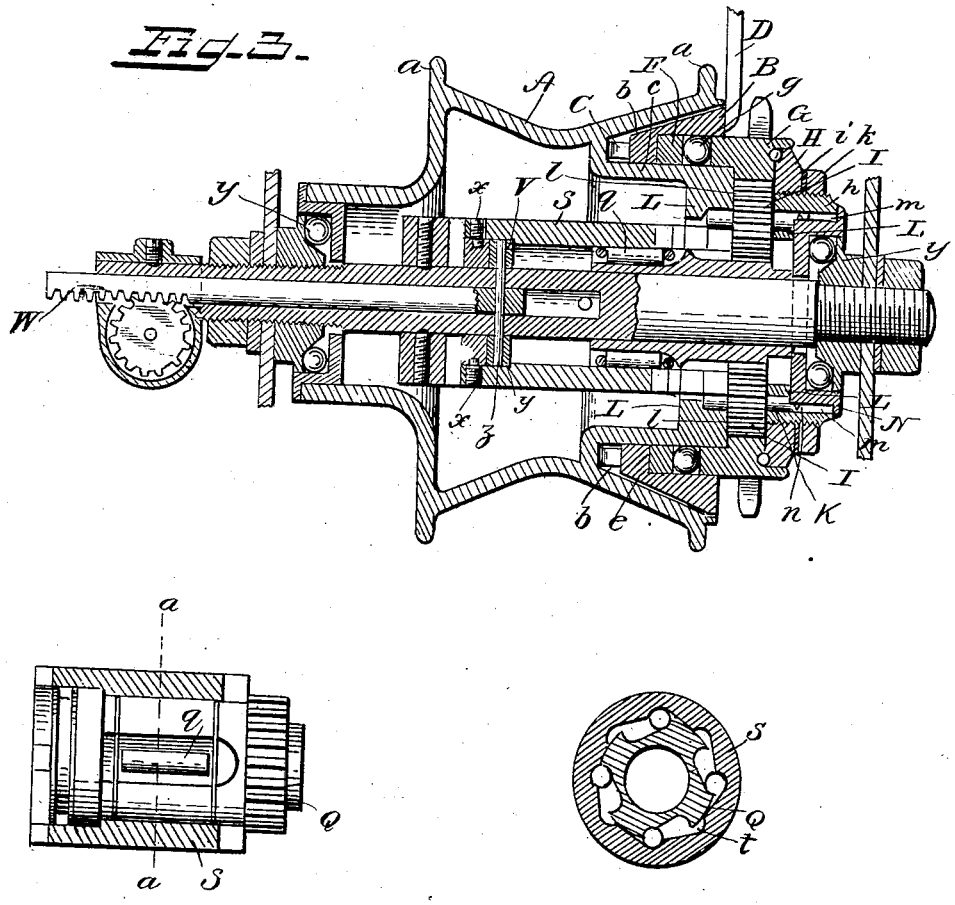

No. 863,423. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
7 SHEETS—SHEET 3.
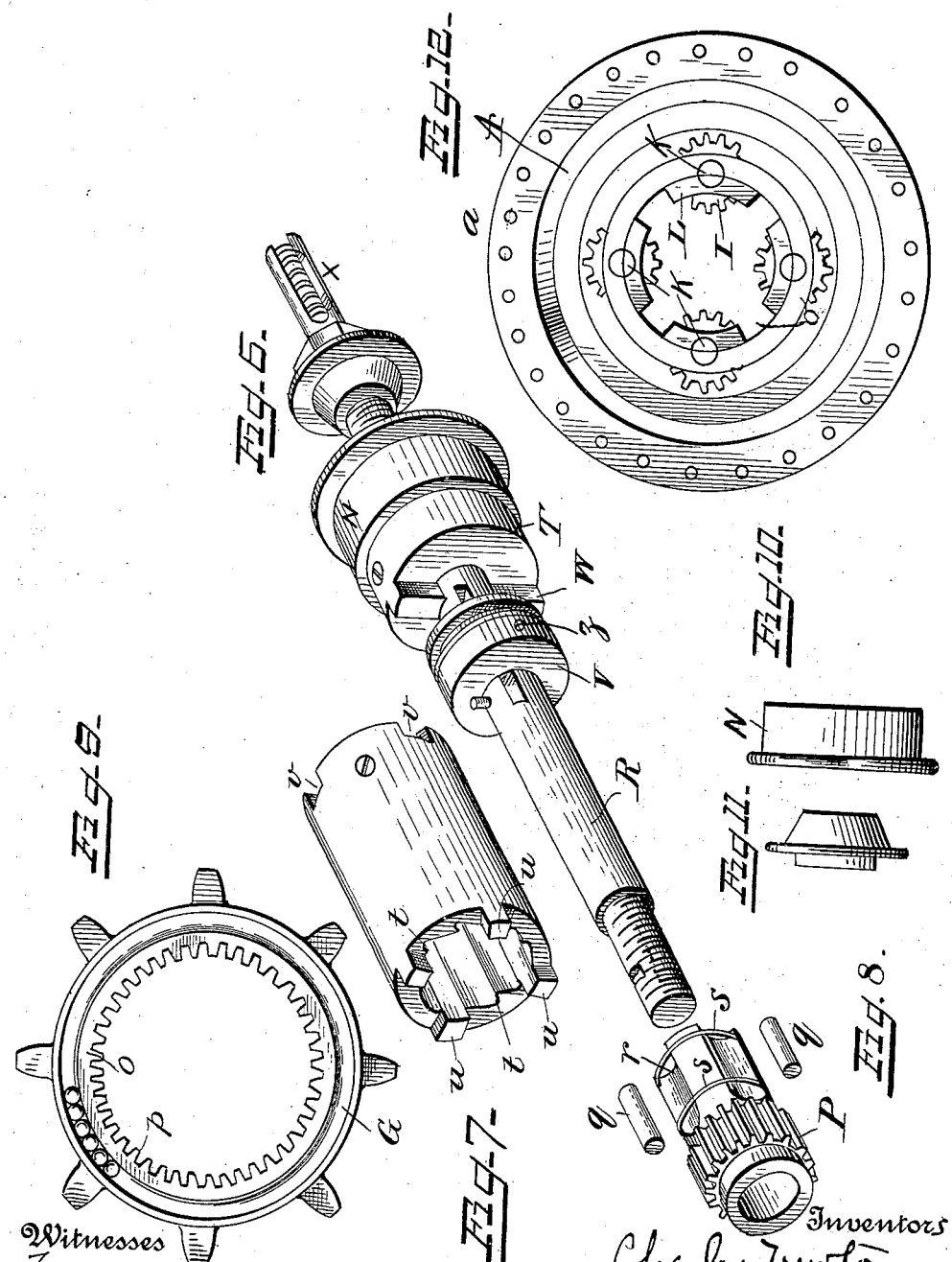

No. 863,423. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
7 SHEETS—SHEET 4.
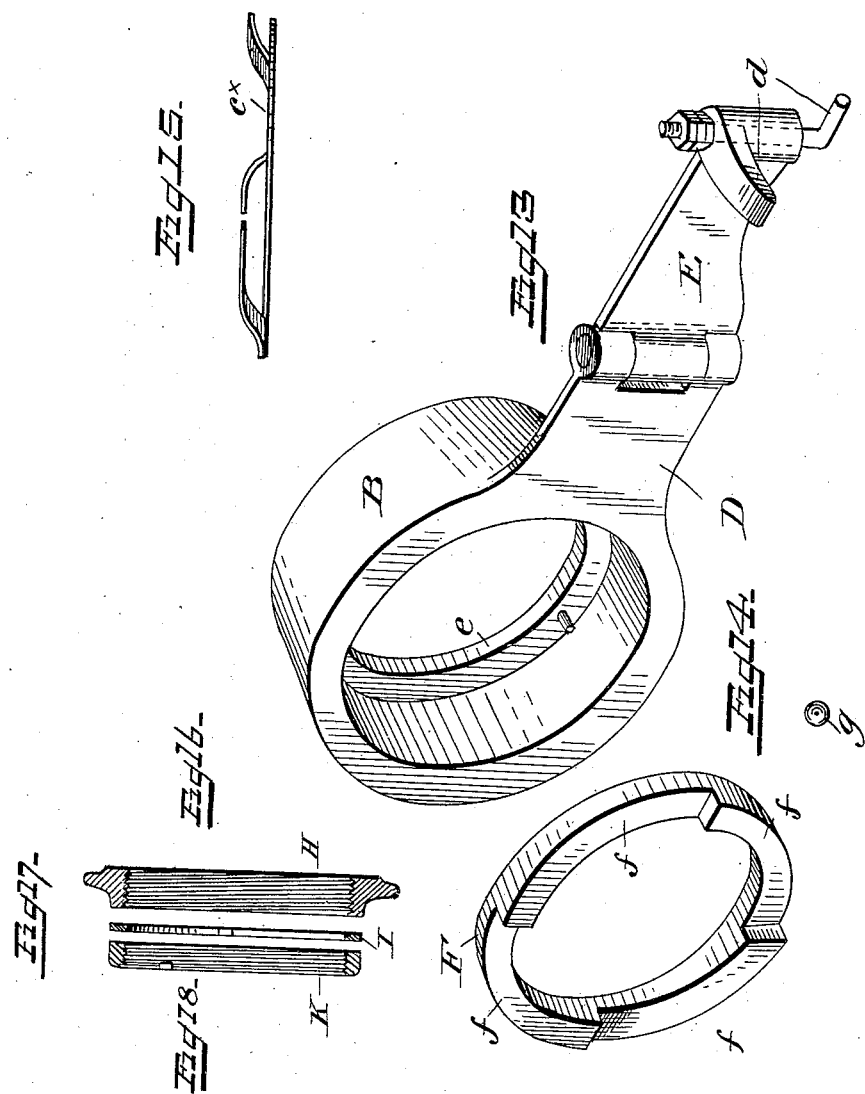

No. 863,423. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
7 SHEETS—SHEET 5.
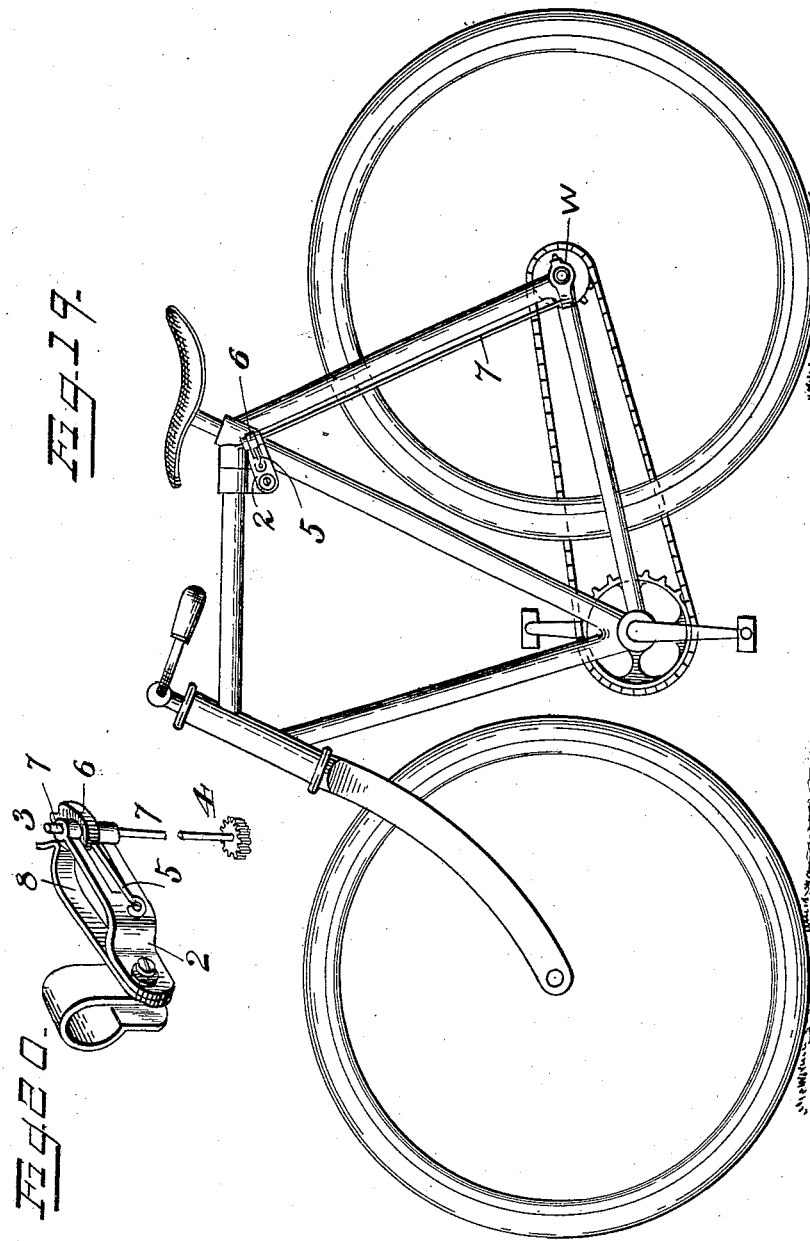

No. 863,423. PATENTED AUG. 13, 1907.
C. NEWTON & F. E. BROWN.
TWO SPEED AND AUTOMATIC COASTER AND BRAKE HUB.
APPLICATION FILED JUNE 9, 1904. RENEWED JULY 1, 1907.
7 SHEETS—SHEET 6.
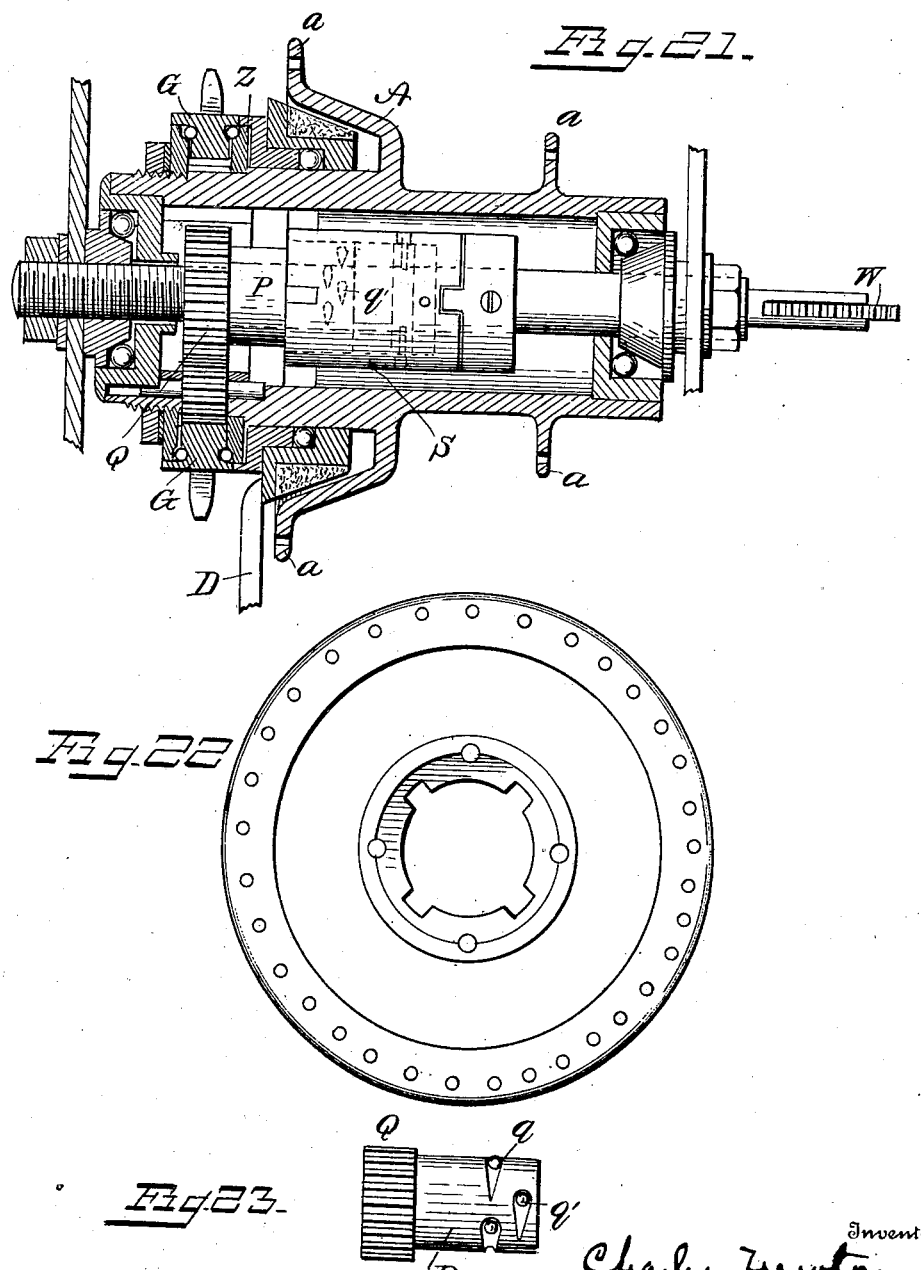
Witnesses
F. L. Ourand
O. McNeil
Inventors
Charles Newton
Fred E. Brown
By Sturtevant & Greeley
Attorneys No. 863,423.  
PATENTED AUG. 13, 1907.

C. NEWTON & F. E. BROWN.
TWO SPEED AND AUTOMATIC COASTER AND BRAKE HUB.
APPLICATION FILED JUNE 9, 1904. RENEWED JULY 1, 1907.

7 SHEETS—SHEET 7.

UNITED STATES PATENT OFFICE.

CHARLES NEWTON AND FRED E. BROWN, OF TORRINGTON, CONNECTICUT, ASSIGNORS TO THE STANDARD SPOKE & NIPPLE COMPANY, OF TORRINGTON, CONNECTICUT, A CORPORATION OF MAINE.

TWO-SPEED AND AUTOMATIC COASTER AND BRAKE HUB.

No. 863,423.

Specification of Letters Patent.

Patented Aug. 13, 1907.

Application filed June 9, 1904, Serial No. 211,795. Renewed July 1, 1907. Serial No. 381,734.

*To all whom it may concern:*

Be it known that we, CHARLES NEWTON and FRED E. BROWN, citizens of the United States, residing at Torrington, in the county of Litchfield, State of Connecticut, have invented certain new and useful Improvements in Two-Speed and Automatic Coaster and Brake Hubs, of which the following is a description, reference being had to the accompanying drawing and to the letters and figures of reference marked thereon.

Our invention relates to an improvement in hubs, for bicycles, automobiles and other self or power-propelled vehicles.

The objects of the invention are to provide a hub which shall give a high speed, low speed, an automatic free wheel or coaster, and a brake, all contained in said hub, so that no special frame will be required, but the same can be readily applied to any standard frame; to provide a hub in which the drive on both speeds is positive from the sprocket, and in which the hub, central gear and intermediate gears are locked firmly together on the high speed, while on the low speed the hub and intermediate gears travel around on the central gear, the coaster or brake being readily applied on both high and low speeds.

Other objects are to simplify the construction of the hub, to minimize the number of bearings necessary, to lessen strain thereon when the brake is applied, to economize in number of parts, to increase the efficiency and to provide an arrangement which is readily accessible for cleaning and repair purposes, and to provide a device of the character described, in which the mechanical defects of prior existing structures are reduced to a minimum.

The invention, therefore, consists in a combined two speed and automatic coaster and brake hub, embodying certain novel features, which are hereinafter described and referred to in the appended claims, among which features may be mentioned, the special construction of hub, which is adapted to accommodate the special construction of two speed and coaster and brake mechanism; the special construction of two speed mechanism; the special clutch whereby either of the speeds may be used or a free wheel at either of the speeds, as well as various other features which will hereinafter appear.

The invention is illustrated in the accompanying drawings, in which

Figure 25:
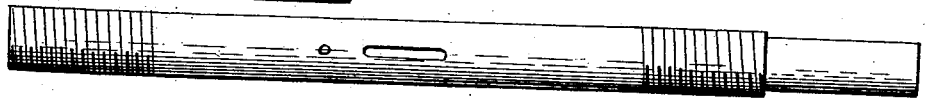
Figure 26:
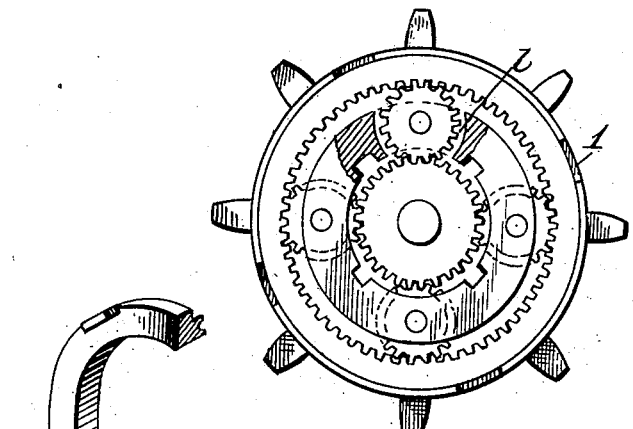
Figure 27:
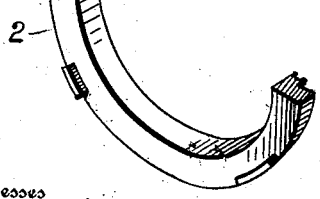

Figure 1 is a side elevation of the hub; Fig. 2 is a view in central longitudinal section, the clutch being shown in proper position for high speed; Fig. 3 is a view in central longitudinal section, the clutch being shown in proper position for low speed; Fig. 4 is a view partly in elevation and partly in section of our free-wheel clutch, while Fig. 5 is a view of said clutch in transverse section on line *a—a;* Fig. 6 is a perspective view in detail of the axle and parts which belong thereon; Fig. 7 is a perspective view of the clutch sleeve or movable clutch member; Fig. 8 is a perspective view of the central gear with rollers and retainers; Fig. 9 is a detail view of sprocket and internal gear; Fig. 10 is a detail view of ball cup; Fig. 11 is a detail view of ball cone; Fig. 12 is an end view of the hub shell showing the pinion gears in place, and also showing the clutch grooves in the hub; Fig. 13 is a perspective view of the brake shoe, the arm and the clamping devices; Fig. 14 is a perspective view of the brake ratchet collar; Fig. 15 is a view in side elevation of the brake spring; Fig. 16 is a sectional view of the sprocket cone; Fig. 17 is a sectional view of the sprocket cone washer; Fig. 18 is a sectional view of the sprocket cone check nut; Fig. 19 is a view of a bicycle in side elevation showing our hub and device for changing speeds thereon; Fig. 20 is a perspective view of the speed shifting device with clamp for attaching same to frame; Fig. 21 is a view in central longitudinal section, showing a modification of our invention, and the form in which it was first constructed; Fig. 22 is an end view of modified hub; Fig. 23 is a detail view of central gear as modified; Fig. 24 is a view partly in elevation, and partly in section of the axle and parts thereon, as modified; Fig. 25 is a view of axle, as modified; Fig. 26 is a view, partly in elevation and partly in section, showing the planetary gearing and clutch grooves in hub, also showing mortises in hub for receiving pinion gears and grooves in sprocket for operating brake collar; and Fig. 27 is a perspective view of brake collar, showing projections for engaging with recesses in sprocket.

In these drawings, A represents the hub as a whole, herein shown as made of one piece of metal and having the flanges *a—a* with openings for the ends of the spokes. The hub is flanged outwardly forming a conical recess *b*, surrounding the cylindrical portion *c* of said hub, this recess being adapted to receive the brake shoe B, which surrounds the cylindrical portion *c* of the hub and which has its external periphery cone-shaped, but held normally out of engagement with the flaring wall of the recess *b*, by the spring plate C. The brake shoe has an arm D to which is pivoted the arm E, carrying the clamp *d* which fits over a stationary part of the frame, thus holding the brake shoe against rotation.

Within the brake shoe B is provided a flange *e* upon which rests a ring F, having a series of inclined surfaces *f*, upon which are supported balls *g*. Upon the balls *g* rests the inner edge of the sprocket G which, when in position fits over the cylindrical portion *c* of the hub. The sprocket is held in position by the usual cone H, secured upon the reduced portion *h*, of the cylindrical part c of the hub and by the washer i and check nut k. It will be seen that when the sprocket is rotated backward, as by back pedaling, it causes the balls g to ride up the inclines f and force the brake shoe against the flaring wall of the recess b, thus braking the hub. The reduced portion h of the hub is provided with openings 1, herein shown as four in number, through which project pinions I, forming the intermediate gearing hereinafter referred to. These pinions rotate on pins K, which are seated in bearing opening m in lugs L, on opposite sides of the pinions, the pins K being squared off in one face at as n, and fitting in the grooves m, and being kept from rotation by the cup N fitting in the reduced portion h of the hub. Between the lugs L are grooves o to receive projections on the clutch sleeve S when the hub is to be run at high speed.

We consider this construction of hub, made in one piece, having clutch grooves therein, and mortised for the pinion gears as of importance, simplifying the mechanism, and giving a support for the pins K on each side of the pinions. From this construction, it also follows that a separate sleeve to support the pinions is not necessary, thus avoiding the use of a separate set of bearings which would have to be provided for such sleeve, if it were used.

The sprocket is provided with the internal rack O, having teeth p, which mesh with the teeth of the pinions I which pinions in turn mesh with the teeth P on the sleeve Q which is on the stationary axle R. This sleeve extends inwardly and is surrounded by a movable clutch member S, and is clutched to said movable clutch member in one direction by means of the rollers q, in recesses r, on the sleeve, which rollers are held from endwise displacement by rings s, and set to clutch the central gear to the movable member by rolling into contact with the straight wall of the groove t, on the inner periphery of the clutch sleeve or movable member.

The movable member of the clutch has at one end projections u, adapted to engage the grooves o in the hub, thus when in that position locking together the hub, gear, that is, the sprocket internal gear, the pinions I and the central gear teeth P, causing the hub to rotate around the stationary axle, thus imparting the higher speed to the hub. At the opposite end from the projections u, the clutch sleeve S has notches v adapted to engage projections w on the stationary member T of the clutch, which is secured to the axle R. Near its inner end the movable member S has one or more openings for the passage of pins or screws x, into a groove in the collar U loose on the axle, which collar is adjacent to another collar V fitting against a shoulder y, on the inner periphery of the movable clutch member, and having a pin Z passing through a slot in the axle and engaging a sliding bar or rod W, which passes into the hollow stationary axle, and has at its outer end teeth X opening into a cut away portion of the axle, whereby the movable member through said bar or rod W and collars, may be shifted to throw one or the other of the speeds into or out of operation. A convenient means for operating said rod or bar W, to change the speeds or to give a free wheel backward movement will be hereinafter described.

When the movable clutch member is in engagement with the stationary clutch member, it is out of engagement with the grooves o of the hub, and, therefore, the hub and the intermediate gears, that is, the pinions K will travel around on the central gear on the sleeve, thus making the speed proportionately less than where said central gear is locked to the others. The usual cone and ball bearings are provided at either end of the hub, as shown at Y, these being by our construction of the other parts of the apparatus all that is necessary for the most practical efficiency.

Although the salient features are present in both structures, the form in which we prefer to embody the invention is illustrated in Figs. 1—20, while Figs. 21—27 illustrate that form in which the main features of the invention were first embodied. In the construction shown in the latter figures, ball bearings and a cone Z were provided back of the sprocket G, and this sprocket G extended over said cone, notches 1 on this part which extended over the cone engaged with the ring 2, operating on the balls for forcing in the brake. The preferred form is better, because it involves a saving of two parts, and a larger plane bearing is provided back of the sprocket, which holds the sprocket up better than a ball bearing. The hub too is of different shape or external construction, although so far as the intermediate and central gears are concerned, the structures are substantially identical. The manner of clutching the sleeve P to the movable clutch member S, is slightly different, balls q' running in inclined grooves, being used instead of the rollers q.

One of the most important features of our invention and upon which we desire to lay particular stress, is the construction whereby on either of the speeds a free wheel is possible. This is so, because of the use of the central gear which is clutched to the movable clutch member, and yet rotates freely about the axle when the movable member is engaged either with the hub or the stationary clutch member, and, therefore, when the sprocket is held from rotation as in coasting, no matter whether the hub is set to high or low speed, a free wheel is provided. It will be seen that by our invention, we provide a hub which will give a high speed, low speed, an automatic free wheel or coaster, and a brake all contained within the hub, and that it surpasses in simplicity those two speed or coaster brake hubs which have been previously made. It is easily assembled or disassembled for examination or repairs: The power is applied to the sprocket, and used directly from the same, since brake, speed gearing and coaster are operated from the sprocket instead of through a sleeve or sleeves. In two speed hubs and coaster brakes, as heretofore made, the two speeds have almost invariably been obtained by running sleeves through the hub, thus making it necessary to provide extra sets of ball bearings to support the same.

In our construction, the hub revolves at all times on one pair of plain ball bearings, whether on high or low speed or coasting, and those bearings are not affected in any way by the operation of the speed gearing or brake. No strain is put upon the bearings when the brake is applied, the free wheel which is automatic may be obtained either in the high or low gear, which result cannot be obtained in many of the two speed hubs heretofore made. The brake can also be applied at any time whether in the high or low gear, or in the coaster. In many of the free wheel hubs heretofore made, two clutches are used, one for the high and one for the low speed, while in our hub, because of the peculiar construction of the clutch, we obtain a free wheel at all times from a single free wheel or coasting clutch. This clutch when driving is positive in its action, having no binding or wedging effect in its operation, and it releases very freely and quickly when the free wheel or coaster is desired. In many of the two speed hubs heretofore made, the low speed has been obtained direct and the high speed by gearing up, thus losing power. In our construction, when in high speed the gearing and clutch are locked to and revolve with the hub, thus operating exactly like a plain hub, revolving on two plain ball bearings, and when in low speed the clutch sleeve is locked to the stationary clutch which is fast to the axle and the low speed is obtained by gearing down.

In many of the two speed hubs heretofore made, the speed mechanism has been clutched to the hub, through pawls while we clutch direct; the sliding clutch sleeve engaging with the hub for high speed and with the stationary clutch collar on the axle for low speed. In this hub the drives for both high and low speed are positive, and the coasting clutch when driving is positive there being no friction driver or spring connected with the speed device, as has been the case with two speed hubs as usually constructed.

In Fig. 19 we have represented a bicycle provided with the mechanism for manipulating the rod or bar W to change from one speed to another, and in detail the hand cam lever is illustrated in Fig. 20. 1 represents a rod or shaft extending from the hub up to a bracket 2, clamped to the framework of the machine, in which bracket 2 it has a bearing as at 3, and carries at its lower end, a pinion 4 meshing with the teeth X in the bar W. 5 represents a hand lever or thumb piece clamped to the shaft 1, by which the latter is rotated to shift the rod or bar W, and through it the movable clutch member. To readily indicate when the proper shift has been accomplished, the end of the hand lever 5 is cam shaped as shown at 6, and is notched as at 7. It is held in either of its extreme positions, or in its intermediate position, by the spring 8 carried by the bracket 2.

In the position of the hand lever 5, shown in Fig. 20, the hub is set for low speed, in the extreme opposite position for high speed, while if it were set to intermediate position with the spring engaging the notch 7, the movable member S of the clutch would be out of engagement with both the hub and the stationary clutch member, and a free wheel backward as well as forward would be provided.

The operation of the hub is as follows: When in high speed the parts are in the position shown in Fig. 2, in which position the clutch sleeve or movable clutch member S is at its extreme right position being in engagement with the hub through the lugs or projections u on clutch sleeve and slots o in hub. The central gear Q being locked with the clutch sleeve S against rotation in one direction, the hub, A, sprocket G, clutch sleeve S, and central gear Q must, therefore, all revolve about the stationary axle R and all at the same speed, that is, at the speed at which the sprocket G is driven. In this position, the pinions or intermediate gears I being held in the hub A do not revolve about their axis, as they are between and engage with the internal, and central gears, said gears being locked in a certain positive position. As the free-wheel clutch between the central gear Q and clutch sleeve S lock said two members to-gether against rotation in one direction, and allow them to revolve freely and independently of each other in the opposite direction, it follows that if when the wheel is revolving forwards, the sprocket G is brought to rest, as when stopping the pedals, a free-wheel will be obtained and the intermediate and central gears will revolve idly owing to the intermediate gears I being carried around within the internal gear O by the hub A. When in low speed the parts are in the position shown in Fig. 3, in which position, the clutch sleeve or movable clutch member S is at its extreme left position, being in engagement with the stationary clutch member T, through the slots v in clutch sleeve S and projections or lugs o on stationary clutch member T. The central gear Q being locked with the clutch sleeve S against rotation in one direction, as the sprocket G and, therefore, the internal gear O are revolved forward, the hub A will rotate at a decreased rate of speed, owing to the intermediate gears I, which are carried by the hub A, being rotated about the then stationary central gear Q. The action of the free-wheel clutch is precisely the same when in low speed, as when in high speed as the same clutch members operate in the same way, and in the same relation to each other, regardless of the speed in which the mechanism may be used. If a free-wheel backwards or what is known as "back-up" is desired, the clutch sleeve or movable clutch member S is shifted to midway between its two extreme positions, in which position said clutch sleeve S is out of engagement with both the hub A and the stationary clutch member T, thus allowing the wheel to be revolved freely backwards as well as forward.

The operation of the brake is as follows: The brake shoe B, being attached to a stationary part of the frame through the brake arm E, is, therefore, a stationary member, and, therefore, it follows that if said brake shoe B be forced in against the conical surface b of hub A, while said hub A is revolving the hub will be braked or brought to rest. When the free-wheel or coaster is in operation the sprocket G is at rest, or a stationary member as is the brake shoe. Now if the sprocket G be revolved backwards, as by back-pedaling, the balls g will ride up the inclined faces f of the brake ratchet collar F, thus forcing the brake shoe B against the hub A and braking same as before described. When the pedals, or, therefore, the sprocket G is again revolved forwards the brake shoe B will be forced out of contact with the hub by the spring plate C, thus relieving the hub of the brake.

The changing from one speed to the other speed is effected by sliding the clutch sleeve or movable clutch member S back or forth as before described.

Various minor modifications and changes may be made, without departing from the spirit of our invention.

Having thus described our invention, what we claim as new, and desire to secure by Letters Patent, is:—

1. The combination with the hub, the sprocket thereon, the internal gear on the sprocket, the intermediate pinions supported on the hub and in mesh with the sprocket, the stationary axle, the central gear thereon in mesh with the intermediate pinions, the movable clutch member, the stationary clutch member on the axle, means for shifting the movable clutch member to cause it to directly engage the hub, or stationary clutch member, said central gear being loose on the axle and clutch devices between the central gear and the movable clutch member, whereby said central gear is free to rotate independently of the movable clutch member in one direction, but clutched to it against movement in the opposite direction; substantially as described.

2. The combination with the hub, the sprocket thereon, the internal gear in the sprocket, the intermediate pinions supported in the hub, and in mesh with the sprocket, the stationary axle, a movable clutch member, a stationary clutch member, means for shifting the movable clutch member to directly engage the hub, or stationary clutch, a central gear meshing with the intermediate gears or pinions and clutch devices between the central gear and movable clutch member to permit independent rotation of the central gear in one direction to allow a free wheel, but to prevent such movement in the opposite direction; substantially as described.

3. In the herein described two speed gear mechanism, including a hub, a sprocket, a stationary axle and pinions supported on the hub and in mesh with the sprocket, a movable clutch member, a stationary clutch member of a single central gear loose on the axle and in mesh with the pinions and clutch devices between the central gear and the movable clutch member, whereby said central gear is free to rotate independently of the movable clutch member in one direction but clutched to it against movement in the opposite direction; substantially as described.

4. The combination with the hub, the sprocket thereon, the internal gear in the sprocket, the intermediate pinions supported in the hub and in mesh with the sprocket, the stationary axle, a movable clutch member having projections adapted to engage grooves formed in the body of the hub, a stationary clutch member, and means for shifting the movable clutch member to directly engage alternately the hub and stationary clutch, a central gear meshing with the pinions and clutch devices between the central gear and the movable clutch member, whereby said central gear is clutched to the movable clutch member in one direction but independently movable of the same in the other direction; substantially as described.

5. In combination with the hub, the stationary axle, a two speed driving mechanism and a coasting mechanism including the sprocket and gearing and the clutch mechanism having a movable member and a free coasting member clutched to the movable member in one direction only, and on both speeds, but having a free rotation on both speeds when the sprocket is held stationary.

6. In combination with the hub and the stationary axle and the driving and coasting mechanism, including the sprocket and gearing, said gearing including a central gear, and a clutch mechanism having a movable member; said central gear being a free coasting member, and clutch devices between the central gear and the movable member, whereby the central gear is clutched to the movable member in one direction only, but has a free rotation when the sprocket is held stationary; substantially as described.

7. In combination with the hub, the sprocket thereon, the intermediate pinions, said hub being provided with openings to receive the pinions and having internal lugs upon opposite sides of each pinion, pins supported on said lugs upon which the pinions rotate, said pins fitting in grooves in the hub and squared upon one side to prevent rotation thereof; substantially as described.

8. In combination with the hub having the central cylindrical portion and a reduced portion having openings therein, the sprocket on the hub, the internal gear in the sprocket, the intermediate pinions supported in said openings and in mesh with the sprocket, a stationary axle, a movable clutch member, lugs in the interior of the hub on opposite sides of said openings in which the pinion pins are supported, longitudinal grooves between the lugs, said movable clutch member having projections adapted to engage said grooves, a stationary clutch member, and means for shifting the movable clutch member to directly engage alternately the hub and stationary clutch, and a central gear meshing with the pinions, and clutch devices between the central gear and the movable clutch member, whereby said central gear is clutched to the movable clutch member in one direction, but independently movable of the same in the other direction; substantially as described.

9. In combination with the hub, the stationary axle passing through the same, the stationary clutch member on the axle, the movable clutch member having sliding and rotary movement in said axle, a sleeve; a gear carried on said sleeve clutch devices between the sleeve and the movable clutch member to permit independent movement of the clutch member and sleeve in one direction only, pinions carried by the hub, a sprocket on said hub having internal gear meshing with the pinions; substantially as described.

10. In combination with the hub, the stationary axle passing through the same, the stationary clutch member on the axle, the movable clutch member having sliding and rotary movement on said axle, a sleeve; a gear carried on said sleeve clutch devices between the sleeve and the movable clutch member to permit independent movement of the clutch member and sleeve in one direction only, pinions carried by the hub, a sprocket on said hub having internal gear meshing with the pinions, and means for shifting the movable clutch, comprising a sliding rod within the hollow movable clutch, comprising a sliding rod within the hollow axle, a collar sliding on said axle, and pinned to said rod and resting against a shoulder on the movable member, and a second collar sliding on said shaft, and having a groove, with pins or screws passing through said movable member into the groove, and means for sliding the rod; substantially as described.

11. In combination with the hub, the stationary axle passing through the same, the stationary clutch member on the axle, the movable clutch member having sliding and rotary movement on said axle, a sleeve; a gear carried on said sleeve clutch devices between the sleeve and the movable clutch member to permit independent movement of the clutch member and sleeve in one direction only, pinions carried by the hub, a sprocket on said hub having internal gear meshing with the pinions, a shifting rod connected with the movable member, and means for operating it, said means comprising an oscillating shaft engaging at its lower end the shifting rod, and at its upper end bearing in a member supported on the machine frame, a hand lever clamped to the oscillating shaft, and having a cam on its inner end, and a spring engaging the cam to hold the lever in its position in which it may be placed; substantially as described.

12. A two speed hub mechanism comprising the sprocket, the stationary axle, the central gear and the intermediate gears between the sprocket and the central gear, a clutch mechanism having on the axle a stationary member and a movable member for locking the sprocket, the central gear and intermediate gears, together, for high speed and for locking the central gear to the stationary clutch member against rotation in one direction to allow the sprocket and intermediate gears to rotate around said central gear for low speed; substantially as described.

13. A two speed hub and coaster mechanism, comprising the sprocket, the central gear, and the intermediate gears between the sprocket and the central gear, a clutch mechanism having a stationary member and a movable member for locking the sprocket, the central gear and intermediate gears together for high speed, and for locking the central gear to the stationary clutch member against rotation in one direction to allow the sprocket and intermediate gears to rotate around said central gear for low speed, and a clutch device between the central gear and the movable member whereby the central gear is clutched to the movable member on both high and low speeds against movement in one direction, but free to rotate in the other direction, when the sprocket is held stationary; substantially as described.

14. A two speed hub and coaster mechanism, comprising the sprocket, the central gear and the intermediate gears between the sprocket and the central gear, a clutch mechanism having a stationary member and a movable member for locking the sprocket, central gear and intermediate gears together for high speed, and for locking the central gear to the stationary clutch member against rotation in one direction to allow the sprocket and intermediate gears to rotate around said central gear for low speed, and a free sleeve carrying the central gear and a clutch device between the free sleeve and the movable member, whereby the free sleeve carrying the central gear is clutched to the movable member on both high and low speeds against movement in one direction, but free to rotate in the other direction when the sprocket is held stationary; substantially as described.

15. In the herein described apparatus, and in combination, the central sleeve having the gear, the movable clutch member, and the rollers for clutching the sleeve to the clutch member in one direction, said rollers being held from end displacement by rings; substantially as described.

In testimony whereof we affix our signatures, in presence of two witnesses.

CHARLES NEWTON.
FRED E. BROWN.

Witnesses:
S. R. SHEPARD,
E. L. FINN.